May 18, 1937.　　　　H. H. GRECE　　　2,080,472
LUBRICATED DUST GUARD
Filed June 4, 1936　　　3 Sheets-Sheet 1
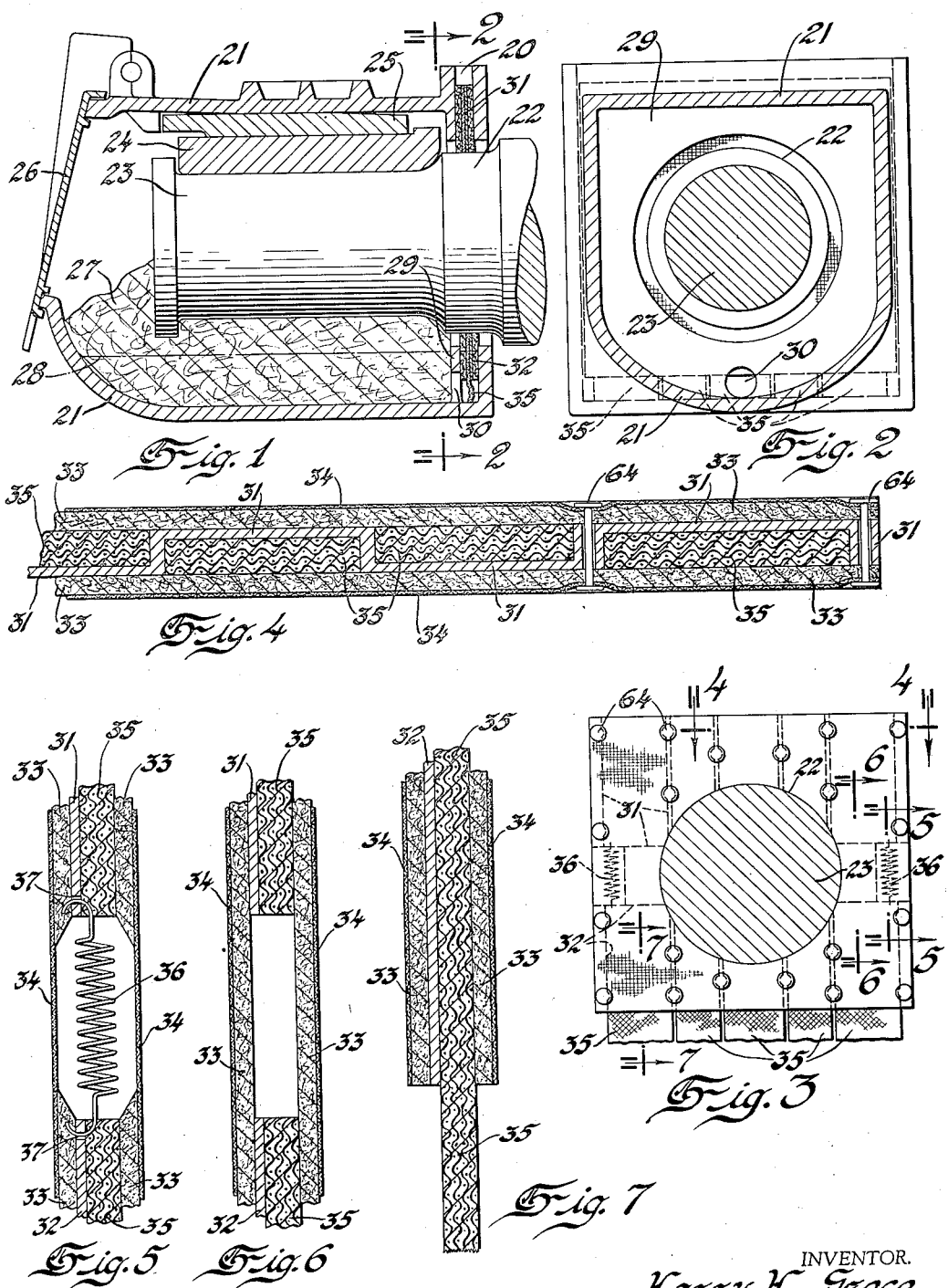
INVENTOR.
Harry H. Grece
BY
Everett L. Wright
ATTORNEY.

May 18, 1937.  H. H. GRECE  2,080,472
LUBRICATED DUST GUARD
Filed June 4, 1936  3 Sheets-Sheet 2

INVENTOR.
Harry H. Grece
BY Evartt G. Wright
ATTORNEY.

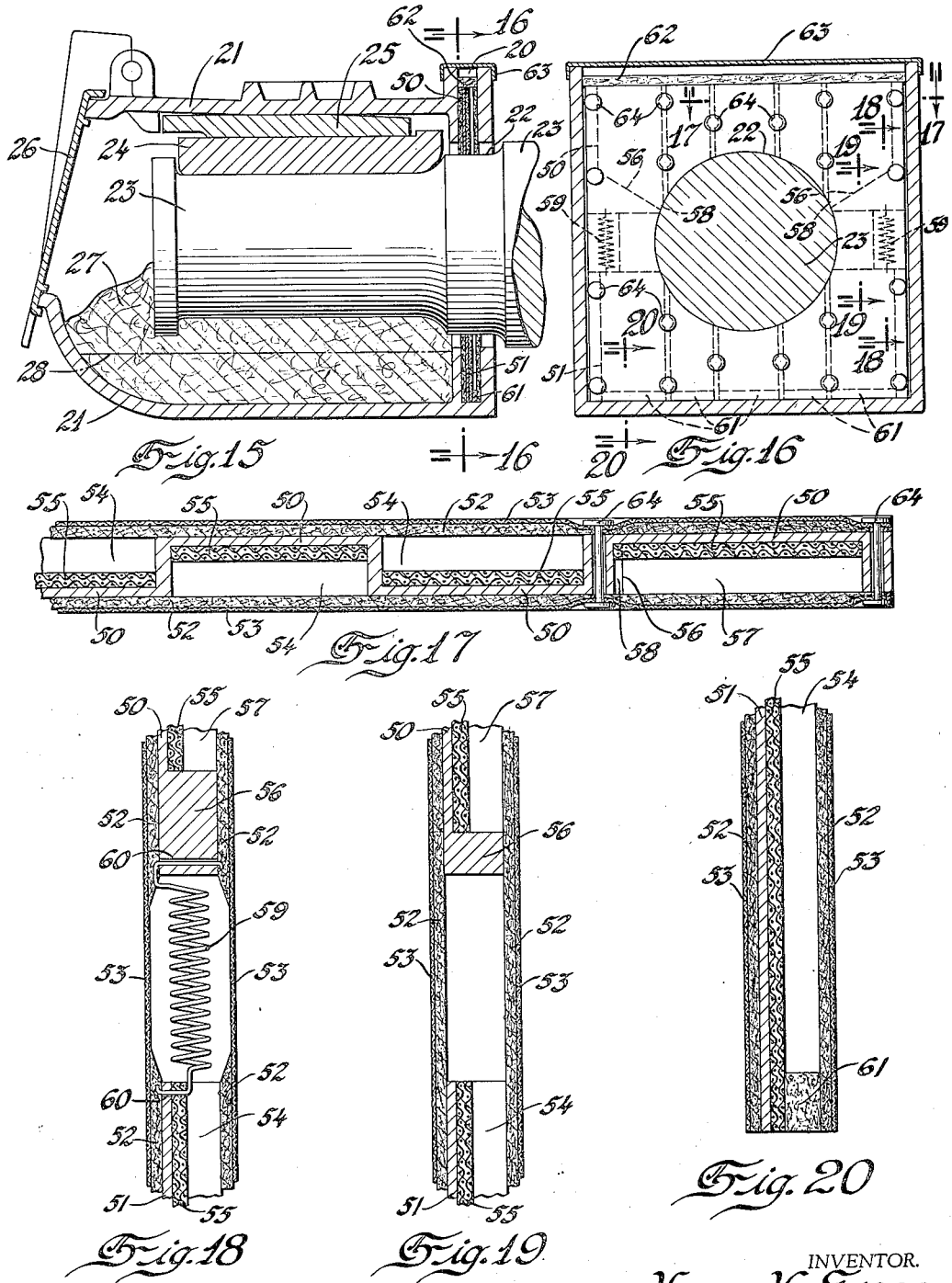

Patented May 18, 1937

2,080,472

UNITED STATES PATENT OFFICE 2,080,472

LUBRICATED DUST GUARD

Harry H. Grece, Detroit, Mich.

Application June 4, 1936, Serial No. 83,546

20 Claims. (Cl. 286—6)

This invention relates to dust guards and in particular to lubricated dust guards adapted to seal the opening between the hub seat of a railroad car axle and the journal box.

The rear of the journal box of a railroad car is usually provided with a pocket into which a dust guard is placed to prevent dust, grit, sand, cinders and the like from entering the journal box at its rear opening through which the axle projects. There have been many types of dust guards used, none of which provide continuous and satisfactory service over a long period of time because of overheating and excess wear caused by being secured too tightly around the car axle and because of distortion resulting from the constant pounding of the car over rail joints, flat spots on car wheels, and the like.

The main object of this invention is to provide a dust guard for railroad car journal boxes which will have a long life under severe service conditions and withstand the constant pounding of the car substantially without distortion.

Another object of this invention is to provide a wear resisting lubricated dust guard for journal boxes adapted to grip the hub seat of a car axle.

Another object of the invention is to provide a wear resisting dust guard for journal boxes adapted to be lubricated with lubricant from the journal box.

Another object of this invention is to provide a wear resisting dust guard for journal boxes adapted to grip the hub seat of a car axle and supply lubricant to the contact surface between the dust guard and hub seat.

Another object of this invention is to provide a dust guard for journal boxes having wear resisting means adapted to contact the hub seat of the car axle and lubricate the said wear resisting means.

Another object of this invention is to provide a dust guard for journal boxes adapted to resiliently grip the hub seat of a car axle, the said dust guard having a wear resisting means and lubricating means arranged in peripheral staggered relation to each other to assure constant and complete lubrication of all portions of the wear resisting means in contact with the car axle.

Another object of this invention is to provide the combination of a journal box and a dust guard therefor in which the journal box is provided with an aperture between the journal box and the dust guard pocket thereof through which lubricant is permitted to pass for lubricating the dust guard.

Other objects of this invention will become apparent by reference to the following detailed description taken in connection with the accompanying drawings, in which:

Fig. 1 is a longitudinal sectional view through a journal box adapted to supply lubricant to a dust guard embodying the invention positioned in the dust guard pocket thereof and gripping the hub seat of a car axle.

Fig. 2 is a cross sectional view taken on the line 2—2 of Fig. 1 looking in the direction indicated by the arrows.

Fig. 3 is an elevational view of a dust guard illustrating one embodiment of the invention positioned around the hub seat of a car axle.

Fig. 4 is an enlarged fragmentary horizontal sectional view taken on the line 4—4 of Fig. 3.

Fig. 5 is an enlarged fragmentary vertical sectional view taken on the line 5—5 of Fig. 3 showing spring means for causing the dust guard to grip the hub seat of a car axle.

Fig. 6 is an enlarged fragmentary vertical sectional view taken on the line 6—6 of Fig. 3 showing the zigzag plate and wicking of the upper and lower half of the dust guard spaced apart at the horizontal center thereof.

Fig. 7 is an enlarged fragmentary vertical sectional view taken on the line 7—7 of Fig. 3 showing wicking depending from the lower half of the dust guard.

Fig. 15 is a longitudinal sectional view through a journal box having a dust guard embodying the invention in the dust guard pocket thereof.

Fig. 16 is a cross sectional view taken on the line 16—16 of Fig. 15 showing in elevation a dust guard illustrating another embodiment of the invention.

Fig. 17 is an enlarged fragmentary horizontal sectional view taken on the line 17—17 of Fig. 16.

Fig. 18 is an enlarged fragmentary vertical sectional view taken on the line 18—18 of Fig. 16 showing spring means for causing the dust guard to grip the hub seat of a car axle.

Fig. 19 is an enlarged fragmentary vertical sectional view taken on the line 19—19 of Fig. 16 showing the zigzag plate and wicking of the upper and lower half of the dust guard spaced apart at the horizontal center thereof.

Fig. 20 is an enlarged fragmentary vertical sectional view taken on the line 20—20 of Fig. 16.

Figures 8, 10, 11, 12:
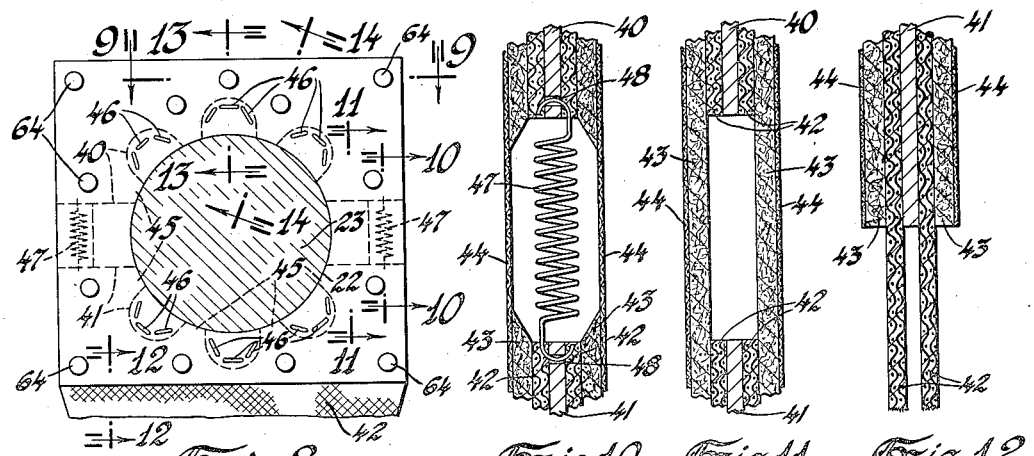
Fig. 8 is an elevational view of a dust guard illustrating another embodiment of the invention positioned around the hub seat of a car axle.
Fig. 10 is an enlarged fragmentary vertical sectional view taken on the line 10—10 of Fig. 8 showing spring means for causing the dust guard to grip the hub seat of a car axle.
Fig. 11 is an enlarged fragmentary vertical sectional view taken on the line 11—11 of Fig. 8 showing the central wear resisting plate and wicking of the upper and lower half of the dust guard spaced apart at the horizontal center thereof.
Fig. 12 is an enlarged fragmentary vertical sectional view taken on the line 12—12 of Fig. 8 showing wicking depending from the lower half of the dust guard.

Referring particularly to the drawings wherein like numerals refer to like and corresponding parts throughout the several views, the embodiment of the invention disclosed in Figs. 1 to 7 inclusive is shown positioned in the dust guard pocket 20 of a journal box 21 and gripping the hub seat 22 of the car axle 23 journaled in the said journal box by means of the bearing 24 secured in the top of the said journal box 21 by a suitable wedge 25. The journal box 21 is provided with a spring closed hinged lid 26 which covers its front opening, is packed with suitable oil or other lubricant saturated waste 27, and is filled to the level as indicated by the dot and dash line 28 in Fig. 1 with a suitable lubricant.

The partition wall 29 separating the dust guard pocket 20 from the main portion of the journal box 21 is provided with an aperture 30 therethrough, preferably at the low point of the said journal box, to permit free lubricant from the main portion of the journal box 21 to flow into the bottom of the dust guard pocket 20 thereby supplying lubricant to a suitable dust guard positioned in the said dust guard pocket 20.

The embodiment of the dust guard shown in Figs. 1 to 7 inclusive comprises upper and lower preferably zigzag wear resisting plates 31 and 32 of Babbitt or other suitable material harmless to the surface of the hub seat 22 of the car axle 23 having a pad of felt or the like 33 and a closely woven covering of canvas or other suitable material 34 riveted or otherwise secured on each side thereof as best illustrated in Figs. 3 and 4. The vertically disposed cavities formed between the zigzag plates 31 and 32 and the felt pads 33 are filled with suitable wicking bats 35 which depend below the lower zigzag plate 32 as shown in Figs. 1, 2, 3 and 7 into a reservoir of free lubricant in the bottom of the dust guard pocket 20 filled with lubricant from the main portion of the journal box 21. The upper and lower zigzag plates 31 and 32 are assembled in spaced relation to each other as best shown in Figs. 3, 5 and 6 and are arcuately formed to engage the hub seat 22 of the car axle 23. The felt pads 33 and the canvas covering 34 are provided with an aperture therethrough to permit the dust guard when assembled to fit around the hub seat 22 of the car axle 23, the inner ends of the wicking bats 35 being cut to register with and wipe the said hub seat 22 of the car axle 23.

As shown in Figs. 3 and 5, the zigzag plates 31 and 32 are adapted to grip the hub seat 22 of the car axle 23 by such means as the springs 36 hooked through suitable apertures 37 provided in the zigzag plates 31 and 32. To provide flexibility of the dust guard to permit the zigzag plates 31 and 32 to be drawn together to compensate for wear, the felt pad and wicking is preferably omitted in the vicinity of the springs 36, and the wicking is preferably omitted between the upper and lower zigzag plates 31 and 32 as best illustrated in Figs. 3, 5 and 6.

The dust guard is of sufficient thickness to fit snugly into the dust guard pocket 20 and at the same time is slidable in relation to the walls thereof, the springs 36 causing the dust guard to tightly grip the hub seat 22 of the car axle 23 when sprung therearound. The dust guard is preferably soaked and saturated with lubricant before being inserted into the dust guard pocket 20 and being sprung around the hub seat 22 of the car axle 23. The lubricant from the journal box 21 entering the dust guard pocket 20 through the aperture 30 in the partition wall 29 between the main portion of the journal box 21 and the dust guard pocket 20 maintains the dust guard in a lubricated state by virtue of the wicking bats 35, felt pads 33 and the canvas covering 34 thereof. The said canvas covering 34 or an equivalent material, though preferably used to provide a comparatively smooth surface seal for the dust guard, may be omitted if desired.

The wicking in the upper half of the dust guard receives lubricant from the wicking in the lower half of the dust guard as a result of the wiping action of the hub seat 22 of the car axle 23 when the car axle rotates in relation to the dust guard. The zigzag wear resisting plates 31 and 32 and the wicking bats 35 provide peripheral alternate wear resisting and oiling means for the upper and lower half of the dust guard in contact with the hub seat 22 of the car axle 23 thereby adding to the life and effective service of the dust guard. The felt pads 33 are constantly maintained in a lubricated state by lubricant from the wicking bats 35, and the wear resisting plates 31 and 32 are oiled at suitable intervals along the edges thereof by the wicking bats 35 to assure constant and complete lubrication of all portions of the wear resisting plates 31 and 32 in contact with the hub seat 22 of the car axle 23, all contributing to provide a fully lubricated dust guard capable of functioning as such for long periods of time under the severe service, weather and temperature conditions encountered in railroad service.

Referring now to Figs. 8 to 14 inclusive, the embodiment of the dust guard shown therein also grips the hub seat 22 of a car axle 23, fits into the dust guard pocket 20 of a journal box 21 and is supplied with lubricant therefrom through an aperture 30 through the low point of the partition wall 29 separating the dust guard pocket 20 from the main portion of the journal box 21, all the same as indicated in Fig. 1.

Figure 9:
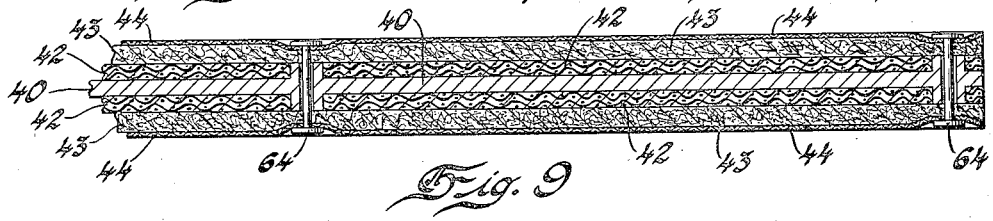
Fig. 9 is an enlarged fragmentary horizontal sectional view taken on the line 9—9 of Fig. 8.
Figure 13:
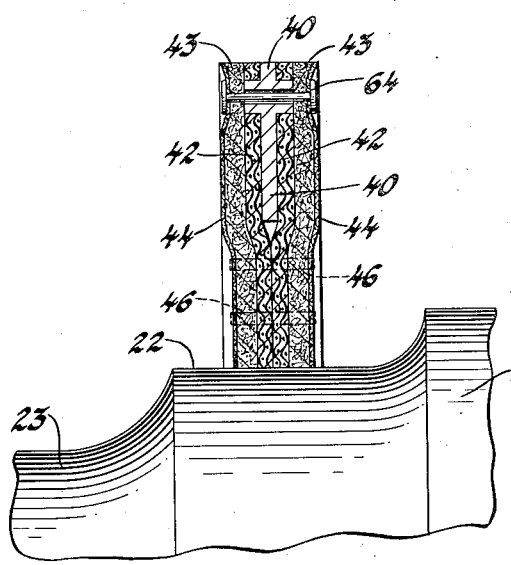
Fig. 13 is an enlarged cross sectional view taken on the line 13—13 of Fig. 8 through an arcuate scollop in the central wear resisting plate showing the felt and wicking of the dust guard drawn together and in contact with the hub seat of a car axle.
Figure 14:
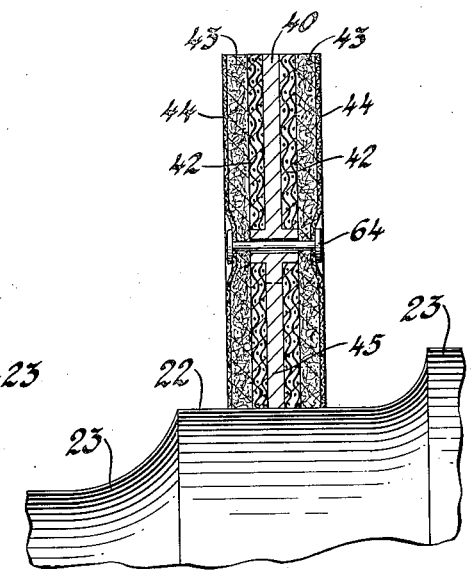
Fig. 14 is an enlarged cross sectional view taken on the line 14—14 of Fig. 8 showing the dust guard and central wear resisting plate in contact with the hub seat of a car axle.

The embodiment of the invention shown in Figs. 8 to 14 inclusive comprises a dust guard having upper and lower wear resisting plates 40 and 41 of Babbitt or other suitable material harmless to the surface of the hub seat 22 of the car axle 23 with a pad of wicking 42, a pad of felt or the like 43 and a covering of closely woven canvas or other suitable material 44 riveted or otherwise secured on each side thereof as best illustrated in Figs. 8 and 9. The upper and lower wear resisting plates 40 and 41 are arcuately formed to permit the same to engage the hub seat 22 of the car axle 23, the said wear resisting plates 40 and 41 being scolloped along the arcuately formed portion thereof to provide spaced tabs 45 for engaging the said hub seat 22 of the car axle 23 at intervals on the periphery thereof. The pads of wicking 42, pads of felt 43, and the canvas covering 44 are provided with an aperture therethrough to permit the dust guard when assembled to fit around the hub seat 22 of the car axle 23.

The pads of wicking 42, pads of felt 43 and the canvas covering 44 are squeezed together between the tabs 45 of the wear resisting plates 40 and 41 by such suitable means as the stitching 46 to provide alternate lubricating and wear resisting means for the upper and lower half of the dust guard in contact with the hub seat 22 of the car axle 23 thereby adding life and effective service to the dust guard.

As shown in Figs. 8 and 10, the wear resisting plates 40 and 41 are adapted to grip the hub seat 22 of the car axle 23 by such means as the springs 47 hooked through suitable apertures 48 provided in the wear resisting plates 40 and 41. To provide flexibility of the dust guard to permit the wear resisting plates 40 and 41 to be drawn together to compensate for wear, the felt pad and wicking is preferably omitted in the vicinity of the springs 47, and the wicking may be omitted between the upper and lower wear resisting plates 40 and 41 as best illustrated in Figs. 8, 10 and 11. The wicking pads 42 preferably depend from the dust guard as indicated in Fig. 12 into a reservoir of free lubricant in the bottom of the dust guard pocket 20 filled with lubricant from the main portion of the journal box 21.

The dust guard is of sufficient thickness to fit snugly into the dust guard pocket 20 and at the same time is slidable in relation to the walls thereof, the springs 47 causing the dust guard to tightly grip the hub seat 22 of the car axle 23 when sprung therearound. The dust guard is preferably soaked and saturated with lubricant before being inserted into the dust guard pocket 20 and springing the same around the hub seat 22 of the car axle 23. The lubricant from the journal box 21 entering the dust guard pocket 20 through the aperture 30 in the partition wall 29 between the main portion of the journal box 21 and the dust guard pocket 20 maintains the dust guard in a lubricated state by virtue of the wicking pads 42, felt pads 43 and canvas covering 44 thereof. The said canvas covering 44 or equivalent material, though preferably used to provide a comparatively smooth surface seal for the dust guard, may be omitted if desired.

The wicking in the upper half of the dust guard receives lubricant from the wicking in the lower half thereof as a result of the wiping action of the hub seat 22 of the car axle 23 when the car axle rotates in relation to the dust guard. The tabs 45 of the wear resisting plates 40 and 41, and the pads of wicking 42 and pads of felt 43 squeezed together between the said tabs 45 provide peripheral alternate wear resisting and oiling means for the upper and lower half of the dust guard in contact with the hub seat 22 of the car axle 23 thereby adding to the life and effective service of the dust guard. The felt pads 43 are constantly maintained in a lubricated state by lubricant from the wicking pads 42, and the tabs 45 of the wear resisting plates 40 and 41 are each oiled independently of the other to assure constant and complete lubrication of the tabs 45 in contact with the hub seat 22 of the car axle 23, all contributing to provide a fully lubricated dust guard capable of functioning as such for long periods of time under severe service, weather and temperature conditions encountered in railroad service.

Referring now to Figs. 15 to 20 inclusive, the embodiment of the invention disclosed therein is shown positioned in the dust guard pocket 20 of a journal box 21 and gripping the hub seat 22 of the car axle 23 journaled in the said journal box 21 by means of the bearing 24 secured in the top of the said journal box by a suitable wedge 25. The journal box 21 is provided with a spring closed hinged lid 26 which covers its front opening, is packed with suitable oil or other lubricant saturated waste 27, and is filled to the level as indicated by the dot and dash line 28 in Fig. 15 with a suitable lubricant.

This embodiment of the improved dust guard is similar in many respects to the embodiment of the dust guard shown in Figs. 1 to 7 inclusive, except that it carries its own lubricant and does not receive lubricant from the main portion of the journal box 21.

The embodiment of the dust guard shown in Figs. 15 to 20 inclusive comprises upper and lower preferably zigzag plates 50 and 51 of Babbitt or other suitable material harmless to the surface of the hub seat 22 of the car axle 23 having a pad of felt or the like 52 and a covering of closely woven canvas or other suitable material 53 riveted or otherwise secured on each side thereof as best illustrated in Figs. 16 and 17. The vertically disposed cavities 54 formed between the zigzag plates 50 and 51 and the felt pads 52 are preferably partially filled with suitable wicking bats 55 as shown in Figs. 17, 18 and 19, the remaining portion of the cavities 54 being utilized as lubricant reservoirs as hereinafter described. The upper and lower zigzag plates 50 and 51 are assembled in spaced relation to each other as best shown in Figs. 16, 18 and 19 and are arcuately formed to engage the hub seat 22 of the car axle 23. The felt pads 52 and the canvas covering 53 are provided with an aperture therethrough to permit the dust guard when assembled to fit around the hub seat 22 of the car axle 23, the inner ends of the wicking bats 55 being cut to register with and wipe the said hub seat 22 of the car axle 23. Although not shown, it is contemplated that when certain types of grease are used as a lubricant, it may be desirable to make the ends of the wicking bats 55 of such shape as will substantially plug or close the bottom of the vertically disposed cavities 54 at the top of the said hub seat 22.

The upper zigzag plate 50 is provided with a sloping bottom 56 at the sides thereof, which, in combination with the felt pad 52 forms lubricant pockets 57 above and to the side of the hub seat 22 of the car axle 23. The bottom of the said pockets 57 are open at 58 at the hub seat 22 of the car axle 23 to permit lubricant therefrom to lubricate the surface of the zigzag plates 50 and 51 in contact with the said hub seat. Although not shown, a small wad or bat of wicking may be placed in the pocket 57 at the opening 58 to regulate or limit the flow of lubricant therefrom.

As shown in Figs. 16 and 18, the zigzag plates 50 and 51 are adapted to grip the hub seat 22 of the car axle 23 by such means as the springs 59 hooked through suitable apertures 60 provided in the zigzag plates 50 and 51. To provide flexibility of the dust guard and to permit the zigzag plates 50 and 51 to be drawn together to compensate for wear, the felt pad and wicking are preferably omitted in the vicinity of the springs 59, and the wicking is preferably omitted between the upper and lower zigzag plates 50 and 51 as best illustrated in Figs. 16, 18 and 19. The bottoms of the cavities in the lower zigzag plate 51 are preferably sealed by felt strips 61 or the like as indicated in Figs. 16 and 20.

The dust guard is of sufficient thickness to fit snugly into the dust guard pocket 20 and at the same time is slidable in relation to the walls thereof, the springs 59 causing the dust guard to tightly grip the hub seat 22 of the car axle 23 when sprung therearound. The dust guard is preferably soaked and saturated with lubricant and the vertically disposed cavities 54 and the pockets 57 thereof are filled with suitable lubricant before being inserted into the dust guard pocket 20 and being sprung around the hub seat 22 of the car axle 23.

A hard grease, lime soap grease, soda soap grease or the like which lubricates at certain temperatures or a lubricant of relatively high viscosity may be used in the cavities 54 and pockets 57 in the upper half of the dust guard, and a lubricant of relatively low viscosity may be used in the cavities 54 in the lower half of the dust guard. It is contemplated that the thickness of the wicking bats 55 may be materially increased when lubricant of a comparatively low viscosity is used in the lower half of the dust guard. The lubricant with which the dust guard is saturated prior to being placed in service and the lubricant in the lower half thereof will maintain and assure constant and complete lubrication of all portions of the dust guard and wear resisting plates 50 and 51 in contact with the hub seat 22 of the car axle 23 over long periods of time, however, if and when additional lubrication is necessary due to excess heating of the dust guard in contact with the car axle caused by heat from the car axle or the depletion of lubricant in the lower half of the dust guard, then the temperature controlled lubricant, soda soap grease, lime soap grease or lubricant of comparatively high viscosity from the cavities 54 and pockets 57 in the upper half of the dust guard will add to the lubrication of the contact surface between the dust guard including its wear resisting plates 50 and 51 and the hub seat 22 of the car axle 23.

The lubricant is spread from the lower to the upper portion of the dust guard and vice versa by the wiping action of the hub seat 22 of the car axle 23 as a result of the rotation of the car axle 23 in relation to the dust guard. The zigzag wear resisting plates 50 and 51 and the wicking bats 55 provide peripheral alternate wear resisting and oiling means for the upper and lower half of the dust guard in contact with the hub seat 22 of the car axle 23 thereby adding to the life and effective service of the dust guard.

The dust guard may, of course, be replenished with oil after the lubricant therein has been expended in service by inserting a suitable lubricant into the top of the dust guard pocket 20. The dust guard pocket 20 may be sealed with a felt strip or the like 62, and it may be covered by a suitable cover 63 as indicated in Figs. 15 and 16.

The upper half of the dust guard disclosed in Figs. 15 to 20 inclusive may be used in place of the upper half of the dust guard disclosed in Figs. 1 to 7 inclusive, thus adding to the desirability of the dust guard disclosed in Figs. 1 to 7 inclusive by providing, in combination with a dust guard which receives lubricant from the main portion of a journal box 21, a dust guard which carries its own reservoir of suitable lubricant.

It will be noted that the wear resisting plates in all embodiments of the invention serve to space the felt pads and canvas covering thereof so that the rivets 64 will not materially depress the felt pads and canvas when securing the said pads and canvas thereto and thereby cause the surface between the said rivets to bulge excessively which would prevent the dust guards from sliding in the dust guard pocket 20 of the journal box 21.

The applicant has disclosed as his invention lubricated dust guards having novel features in combination therewith which maintain the dust guards in a lubricated state over long periods of time, assure perfect lubrication of the contact surface between the hub seat of the car axle around which they are sprung, firmly grip the hub seat of the car axle and slidably yet snugly fit into the dust guard pocket of the journal box for providing a perfect dust seal, and which are provided with alternate wear resisting and lubricating means in contact with the said hub seat of the car axle.

Although but three specific embodiments of the invention have been disclosed and described herein, it will be understood that various changes including the size, shape, arrangement and details of the various parts thereof may be made without departing from the spirit of the invention, and it is not intended to limit the scope of the invention other than by the terms of the appended claims.

I claim:

1. In combination with a journal box having a dust guard pocket at the rear thereof and a car axle journaled in said journal box, the partition wall between the main portion of the journal box and the said dust guard pocket having an aperture therethrough substantially at the low point thereof through which free lubricant from the journal box enters the said dust guard pocket, a lubricated dust guard in said dust guard pocket composed of a pair of felt pads and wear resisting means located between said felt pads serving as a spacer therefor, and means secured to said wear resisting means for springing said dust guard around said car axle, the said dust guard having means in contact with said wear resisting means for absorbing lubricant entering said dust guard pocket.

2. In combination with a journal box having a dust guard pocket at the rear thereof and a car axle journaled in said journal box, the partition wall between the main portion of the journal box and the said dust guard pocket having an aperture therethrough substantially at the low point thereof through which free lubricant from the journal box enters the said dust guard pocket, a dust guard composed of a pair of felt pads and wear resisting means between said felt pads in said dust guard pocket adapted to be sprung around said axle, the said dust guard having wicking in contact with said wear resisting means assembled therewith and depending therefrom for lubricating the surface thereof in contact with said axle with lubricant from the said journal box.

3. In combination with a journal box having a dust guard pocket at the rear thereof and a car axle journaled in said journal box, the partition wall between the main portion of the journal box and the said dust guard pocket having an aperture therethrough substantially at the low point thereof through which free lubricant from the journal box enters the said dust guard pocket, a dust guard composed of a pair of canvas covered felt pads in said dust guard pocket, wear resisting means in said dust guard in contact with said axle, and means secured to said wear resisting means for springing said dust guard around said car axle, the said dust guard having means assembled therewith and depending therefrom for lubricating the surface thereof in contact with said axle with lubricant from the said journal box.

4. In combination with a journal box having a dust guard pocket at the rear thereof and a car axle journaled in said journal box, the partition wall between the main portion of the journal box and the said dust guard pocket having an aperture therethrough substantially at the low point thereof through which free lubricant from the journal box enters the said dust guard pocket, a dust guard composed of a pair of canvas covered felt pads, wear resisting means having lubricating means on each side thereof located between said felt pads adapted to be sprung around said axle, the said wear resisting means and lubricating means being arranged in alternate peripheral relationship to each other at the surface thereof in contact with said axle.

5. In combination with a journal box having a dust guard pocket at the rear thereof and a car axle journaled in said journal box, the partition wall between the main portion of the journal box and the said dust guard pocket having an aperture therethrough substantially at the low point thereof through which free lubricant from the journal box enters the said dust guard pocket, a dust guard composed of a pair of canvas covered felt pads, wear resisting means having lubricating means on each side thereof located between said felt pads adapted to be sprung around said axle, the said wear resisting means and lubricating means being arranged in alternate peripheral relationship to each other at the surface thereof in contact with said axle, the said lubricating means depending from said dust guard into the bottom of said dust guard pocket into a reservoir of free lubricant therein.

6. A lubricated dust guard for sealing the opening between a car axle and its journal box comprising a pair of dust repellent lubricant absorbing apertured pads, upper and lower wear resisting elements adapted to engage said car axle assembled between said pads, lubricant conveying means adjacent to said wear resisting elements, and means secured to said wear resisting means for springing the said dust guard around said car axle.

7. A lubricated dust guard for sealing the opening between a car axle and its journal box comprising a pair of dust repellent lubricant absorbing apertured pads, upper and lower wear resisting elements adapted to engage said car axle assembled between said pads, lubricant conveying means adjacent to said wear resisting elements arranged in alternate staggered relationship to said wear resisting elements at the surface thereof in contact with said axle, and means secured to said wear resisting means for springing the said dust guard around said car axle.

8. A lubricated dust guard for sealing the opening between a car axle and its journal box comprising a pair of dust repellent lubricant absorbing apertured pads, upper and lower wear resisting elements adapted to engage said car axle assembled between said pads, lubricant conveying means adjacent to said wear resisting elements, the said lubricant conveying means depending from said dust guard into the bottom of the dust guard pocket of said journal box into a reservoir of free lubricant therein, and means secured to said wear resisting means for springing the said dust guard around said car axle.

9. A lubricated dust guard for sealing the opening between a car axle and its journal box comprising a pair of dust repellent lubricant absorbing apertured pads, upper and lower wear resisting elements adapted to engage said car axle assembled between said pads, lubricant conveying means adjacent to said wear resisting elements arranged in alternate staggered relationship to said wear resisting elements at the surface thereof in contact with said axle, the said lubricant conveying means depending from said dust guard into the bottom of the dust guard pocket of said journal box into a reservoir of free lubricant therein, and means secured to said wear resisting means for springing the said dust guard around said car axle.

10. A lubricated dust guard for sealing the opening between a car axle and its journal box comprising a pair of dust repellent lubricant absorbing apertured pads, zigzag upper and lower wear resisting plates adapted to engage said car axle assembled therebetween forming a plurality of vertically disposed cavities between said plates and said pads, lubricant conveying means in said cavities, and means secured to said zigzag plates for springing said dust guard around said car axle.

11. A lubricated dust guard for sealing the opening between a car axle and its journal box comprising a pair of dust repellent lubricant absorbing apertured pads, zigzag upper and lower wear resisting plates adapted to engage said car axle assembled therebetween forming a plurality of vertically disposed cavities between said plates and said pads, lubricant conveying means in said cavities and depending from said dust guard into the bottom of the dust guard pocket of said journal box into a reservoir of free lubricant therein, and means secured to said zigzag plates for springing said dust guard around said car axle.

12. A lubricated dust guard for sealing the opening between a car axle and its journal box comprising a pair of dust repellent lubricant absorbing apertured pads, zigzag upper and lower wear resisting plates adapted to engage said car axle assembled therebetween forming a plurality of vertically disposed cavities between said plates and said pads, lubricant conveying means and a supply of suitable lubricant in said cavities, and means secured to said zigzag plates for springing said dust guard around said car axle.

13. A lubricated dust guard for sealing the opening between a car axle and its journal box comprising a pair of dust repellent lubricant absorbing apertured pads, a closely woven fabric on the outside of each pad, zigzag upper and lower wear resisting plates adapted to engage said car axle assembled between said fabric covered pads forming a plurality of vertically disposed cavities between said plates and said pads, lubricant conveying means in said cavities and depending from said dust guard into the bottom of the dust guard pocket of said journal box into a reservoir of free lubricant therein, and means secured to said zigzag plates for springing said dust guard around said car axle.

14. A lubricated dust guard for sealing the opening between a car axle and its journal box comprising a pair of dust repellent lubricant absorbing apertured pads, a closely woven fabric on the outside of each pad, zigzag upper and lower wear resisting plates adapted to engage said car axle assembled between said fabric covered pads forming a plurality of vertically disposed cavities between said plates and said pads, lubricant conveying means and a supply of suitable lubricant in said cavities, and means secured to said zigzag plates for springing said dust guard around said car axle.

15. A lubricated dust guard for sealing the opening between a car axle and its journal box comprising a pair of felt pads having an aperture therethrough to accommodate the car axle, wear resisting means and wicking between said felt pads, said wear resisting means serving as spacing means for said felt pads, and means secured to said wear resisting means for springing the said dust guard to said car axle.

16. A lubricated dust guard for sealing the opening between a car axle and its journal box comprising a pair of felt pads having an aperture therethrough to accommodate the car axle, wear resisting means and wicking between said felt pads, said wear resisting means serving as spacing means for said felt pads, said wicking depending from the dust guard into a reservoir of lubricant in the bottom of the dust guard pocket of said journal box, and means secured to said wear resisting means for springing the said dust guard to said car axle.

17. A lubricated dust guard for sealing the opening between a car axle and its journal box comprising a pair of felt pads covered with a closely woven fabric having an aperture therethrough to accommodate the car axle, wear resisting means and wicking between said fabric covered felt pads, said wear resisting means serving as spacing means for said felt pads, and means secured to said wear resisting means for springing the said dust guard to said car axle.

18. A lubricated dust guard for sealing the opening between a car axle and its journal box comprising a pair of felt pads covered with a closely woven fabric having an aperture therethrough to accommodate the car axle, wear resisting means and wicking between said fabric covered felt pads, said wear resisting means serving as spacing means for said felt pads, said wicking depending from the dust guard into a reservoir of lubricant in the bottom of the dust guard pocket of said journal box, and means secured to said wear resisting means for springing the said dust guard to said car axle.

19. A lubricated dust guard for sealing the opening between a car axle and its journal box comprising a pair of felt pads having an aperture therethrough to accommodate a car axle, wear resisting means formed to engage said car axle and space said felt pads for providing lubricant pockets therebetween, wicking in said lubricant pockets adapted to convey lubricant to said car axle at said wear resisting means, and means for springing said dust guard to said car axle with said wear resisting means in contact therewith.

20. A lubricated dust guard for sealing the opening between a car axle and its journal box comprising a pair of felt pads covered with a closely woven fabric having an aperture therethrough to accommodate a car axle, wear resisting means formed to engage said car axle and space said fabric covered felt pads for providing lubricant pockets therebetween, wicking in said lubricant pockets adapted to convey lubricant to said car axle at said wear resisting means, and means for springing said dust guard to said car axle with said wear resisting means in contact therewith.

HARRY H. GRECE.